United States Patent
Sugimoto et al.

(10) Patent No.: US 11,421,066 B2
(45) Date of Patent: Aug. 23, 2022

(54) POLYMER COMPOSITION FOR STEREOLITHOGRAPHY

(71) Applicant: SUMITOMO RUBBER INDUSTRIES, LTD., Kobe (JP)

(72) Inventors: Mutsuki Sugimoto, Kobe (JP); Takuro Akasaka, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 63 days.

(21) Appl. No.: 17/085,673

(22) Filed: Oct. 30, 2020

(65) Prior Publication Data

US 2021/0130523 A1 May 6, 2021

(30) Foreign Application Priority Data

Nov. 1, 2019 (JP) .............................. JP2019-199723
Sep. 23, 2020 (JP) .............................. JP2020-158613

(51) Int. Cl.
*C08F 279/02* (2006.01)
*B33Y 10/00* (2015.01)
*B33Y 70/00* (2020.01)
*B29C 64/124* (2017.01)
*C08F 255/10* (2006.01)
*B33Y 80/00* (2015.01)
*B29K 33/00* (2006.01)

(52) U.S. Cl.
CPC .......... *C08F 279/02* (2013.01); *B29C 64/124* (2017.08); *B33Y 10/00* (2014.12); *B33Y 70/00* (2014.12); *C08F 255/10* (2013.01); *B29K 2033/12* (2013.01); *B33Y 80/00* (2014.12)

(58) Field of Classification Search
CPC ...... C08F 279/02; C08F 255/10; B33Y 10/00; B33Y 70/00; B33Y 80/00; B29C 64/124; B29K 2033/12
See application file for complete search history.

(56) References Cited

U.S. PATENT DOCUMENTS

| | | | | |
|---|---|---|---|---|
| 2015/0368388 A1* | 12/2015 | Kurata | .................... | C08L 15/00 522/33 |
| 2016/0145452 A1* | 5/2016 | Fong | ..................... | C09D 11/30 524/521 |
| 2019/0010311 A1 | 1/2019 | Yoshinaga et al. | | |

FOREIGN PATENT DOCUMENTS

WO   WO 2017/154335 A1    9/2017
WO   WO-2018165090 A1 *   9/2018   ........... B29C 64/124

* cited by examiner

*Primary Examiner* — Larry W Thrower
(74) *Attorney, Agent, or Firm* — Birch, Stewart, Kolasch & Birch, LLP

(57) ABSTRACT

An object of the present invention is to provide a novel polymer composition for stereolithography that is capable of suitably providing an elastic molded product by stereolithography. A polymer composition for stereolithography containing a liquid polymer and a monomer, the polymer composition for stereolithography having a viscosity of 3,000 mPa·s or less, the viscosity being measured in an environment of a temperature of 25° C. and a relative humidity of 50% using an E-type viscometer under conditions of a cone plate diameter φ of 25 mm and a shear rate of 100 sec$^{-1}$.

14 Claims, No Drawings

POLYMER COMPOSITION FOR STEREOLITHOGRAPHY

FIELD OF INVENTION

The present invention relates to a polymer composition for stereolithography, an elastic molded product that is a cured product of the polymer composition, and a method for producing an elastic molded product using the polymer composition.

BACKGROUND

In recent years, three-dimensional additive manufacturing devices (so-called 3D printers) are put to practical use, which are used to laminate and cure a resin based on designed data of a three-dimensional structure to produce a three-dimensional structure. Generally known three-dimensional structures produced using three-dimensional additive manufacturing devices include three-dimensional structures made from resins. Meanwhile, three-dimensional structures (elastic molded products) having lower temperature dependency of the elastic modulus and smaller compression set than before, if produced, are expected to be used for applications different from those in the past.

SUMMARY of INVENTION

For example, WO 2017/154335 discloses a rubber composition containing a liquid rubber, which is intended for three-dimensional additive manufacturing. The rubber composition can be applied to a three-dimensional additive manufacturing device to suitably produce an elastic molded product.

In stereolithography techniques such as Stereolithography Apparatus (SLA), Digital Light Processing (DLP), and Liquid Crystal Display (LCD), layers of a liquid composition for stereolithography having a thickness of about 0.01 to 0.5 mm are sequentially laminated and cured so that the composition may be subjected to three-dimensional stereolithography. Therefore, the composition for stereolithography is required to have low-viscosity properties in a room temperature (for example, about 25° C.) environment. Moreover, an elastic molded product that is a cured product of the composition for stereolithography is required to exhibit rubber properties.

Under these circumstances, a principal object of the present invention is to provide a novel polymer composition for stereolithography that is capable of suitably providing an elastic molded product by stereolithography. Further objects of the present invention are to provide an elastic molded product that is a cured product of the polymer composition for stereolithography, and a method for producing an elastic molded product using the polymer composition.

The present inventors intensively studied to achieve the above-mentioned objects. As a result, they found that a polymer composition as described below can suitably provide an elastic molded product by stereolithography: a polymer composition containing a liquid polymer and a monomer, and having a viscosity of 3,000 mPa·s or less, the viscosity being measured in an environment of a temperature of 25° C. and a relative humidity of 50% using an E-type viscometer under conditions of a cone plate diameter φ of 25 mm and a shear rate of 100 sec$^{-1}$. The present invention was completed as a result of further studies based on these findings.

More specifically, the present invention provides the following aspects.

Item 1. A polymer composition for stereolithography containing:
a liquid polymer; and
a monomer,
the polymer composition for stereolithography having a viscosity of 3,000 mPa·s or less, the viscosity being measured in an environment of a temperature of 25° C. and a relative humidity of 50% using an E-type viscometer under conditions of a cone plate diameter φ of 25 am and a shear rate of 100 sec$^{-1}$.

Item 2. The polymer composition for stereolithography according to item 1, wherein the liquid polymer has a (meth)acryloyl group.

Item 3. The polymer composition for stereolithography according to item 1 or 2, wherein the liquid polymer includes at least one of liquid isoprene having a (meth)acryloyl group and liquid isobutylene having a (meth)acryloyl group.

Item 4. The polymer composition for stereolithography according to any one of items 1 to 3, wherein the liquid polymer has a number average molecular weight of 5,000 or more and 500,000 or less.

Item 5. The polymer composition for stereolithography according to any one of items 1 to 4, wherein the liquid polymer has a viscosity of 100 mPa·s or more and 1,000,000 mPa·s or less, the viscosity being measured in an environment of a temperature of 25° C. and a relative humidity of 50% using an E-type viscometer under conditions of a cone plate diameter φ of 25 mm and a shear rate of 100 sec$^{-1}$.

Item 6. The polymer composition for stereolithography according to any one of items 1 to 5, having a content rate of the liquid polymer of 15 mass % or more and 70 mass % or less.

Item 7. The polymer composition for stereolithography according to any one of items 1 to 6, having a percentage of the monomer of 30 mass % or more and 85 mass % or less based on 100 mass % in total of the liquid polymer and the monomer.

Item 8. The polymer composition for stereolithography according to any one of items 1 to 7, further containing an oligomer, and having a percentage of the monomer of 30 mass % or more and 90 mass % or less based on 100 mass % in total of the liquid polymer, the monomer, and the oligomer.

Item 9. The polymer composition for stereolithography according to any one of items 1 to 8, further containing an oligomer, and having a total percentage of the monomer and the oligomer of 30 mass % or more and 90 mass % or less based on 100 mass % in total of the liquid polymer, the monomer, and the oligomer.

Item 10. The polymer composition for stereolithography according to item 8 or 9, wherein the oligomer is at least one of urethane (meth)acrylate and epoxy (meth)acrylate.

Item 11. The polymer composition for stereolithography according to any one of items 8 to 10, wherein the oligomer includes a (meth)acrylate.

Item 12. The polymer composition for stereolithography according to any one of items 1 to 11, wherein the monomer is at least one of monofunctional to tetrafunctional monomers.

Item 13. The polymer composition for stereolithography according to any one of items 1 to 12, wherein the monomer includes a (meth)acrylate.

Item 14. An elastic molded product, which is a cured product of the polymer composition for stereolithography according to any one of items 1 to 13.

Item 15. A method for producing an elastic molded product, the method including:

supplying the polymer composition for stereolithography according to any one of items 1 to 13 onto a molding table, and curing the polymer composition for stereolithography by light irradiation to form a first layer of a cured product;

supplying, onto the first layer of the cured product, the polymer composition for stereolithography for forming a second layer of a cured product, and curing the polymer composition for stereolithography by light irradiation to form the second layer of the cured product; and repeating a step similar to the step of forming the second layer of the cured product until an N-th layer is formed to produce an elastic molded product having a three-dimensional shape.

The present invention can provide a novel polymer composition for stereolithography that is capable of suitably providing an elastic molded product by stereolithography. The present invention can also provide an elastic molded product that is a cured product of the polymer composition for stereolithography, and a method for producing an elastic molded product using the polymer composition.

DETAILED DESCRIPTION OF THE PREFERRED EMBODIMENTS

The polymer co position for stereolithography of the present invention contains a liquid polymer and a monomer, and has a viscosity of 3,000 mPa·s or less, the viscosity being measured in an environment of a temperature of 25° C. and a relative humidity of 50% using an E-type viscometer under conditions of a cone plate diameter $\varphi$ of 25 mm and a shear rate of 100 $\sec^{-1}$. Since the polymer composition for stereolithography of the present invention has the above-mentioned feature, the polymer composition is capable of suitably providing an elastic molded product by stereolithography. In the following, the polymer composition for stereolithography of the present invention, an elastic molded product that is a cured product of the polymer composition, and a method for producing an elastic molded product using the polymer composition will be described in detail.

In the present invention, the "polymer con position for stereolithography" means a polymer composition used in a stereolithography technique in which a polymer composition is repeatedly laminated and photocured based on, for example, designed data of a three-dimensional structure using a three-dimensional additive manufacturing device (a so-called 3D printer) for the stereolithography technique to produce a three-dimensional structure. Various stereolithography techniques such as Stereolithography Apparatus (SLA), Digital Light Processing (DLP), and Liquid Crystal Display (LCD) are known. Since the polymer composition for stereolithography of the present invention has low viscosity at room temperature (25° C.) and is capable of being suitably cured by light irradiation to provide an elastic molded product, the polymer composition can be suitably used for producing an elastic molded product by a stereolithography technique.

In the present invention, the term "(meth)acryloyl group" means "an acryloyl group or a methacryloyl group", and terms similar to the above are similarly interpreted. In addition, herein, numerical values joined by the word "to" mean a numerical range including the numerical values before and after the word "to" as the lower and upper limits, respectively. When a plurality of lower limits and a plurality of upper limits are separately described, it is possible to select any numerical values of the lower and upper limits and join the numerical values by the word "to".

<Polymer Composition for Stereolithography>

The polymer composition for stereolithography of the present invention contains a liquid polymer as a polymer and a monomer, and is cured by light irradiation into an elastic molded product.

The polymer composition for stereolithography of the present invention has a viscosity of 3,000 mPa·s or less, the viscosity being measured in an environment of a temperature of 25° C. and a relative humidity of 50% using an E-type viscometer under conditions of a cone plate diameter $\varphi$ of 2.5 mm and a shear rate of 100 $\sec^{-1}$. From the viewpoint of allowing an elastic molded product that is a cured product of the polymer composition to exhibit excellent properties while ensuring a viscosity suitable for stereolithography in a room temperature environment, the viscosity is preferably 2,500 mPa·s or less, more preferably 2,000 mPa·s or less. The lower limit of the viscosity is, for example, 5 mPa·s or more, preferably 10 mPa·s or more, more preferably 20 mPa·s or more, still more preferably 30 mPa·s or more.

In general, the stereolithography technique includes a step of sequentially laminating and photocuring a polymer composition for stereolithography on a flat surface called a molding table (stage) of a stereolithography device. In this step, the thickness of one layer in the laminate during curing of the polymer composition for stereolithography is controlled to about 0.01 to 0.5 mm, and then the polymer composition is irradiated with light (UV light) to form a photocured layer (cured product) having a thickness of about 0.01 to 0.5 mm. Immediately after the photocuring, the molding table moves to produce a gap having a width of about 0.01 to 0.5 mm that is the same as the thickness of the above-mentioned layer, the polymer composition for stereolithography flows into the gap, and the polymer composition is irradiated with light to form a photocured layer (cured product). Repetition of this process gradually laminates the photocured layers to increase the thickness of the elastic molded product. If the polymer composition for stereolithography has a viscosity exceeding 3,000 mPa·s, the polymer composition hardly flows into the gap having a width of about 0.01 to 0.5 mm, and it is difficult to suitably form a photocured layer. Although it is possible to slow the movement speed of the molding table until sufficient amount of the polymer composition for stereolithography flows into the gap, the slow movement speed may lower the productivity. Moreover, wiggling of the molding table may apply high shear force to the polymer composition for stereolithography to damage the structure during the stereolithography.

The liquid polymer is not particularly limited, and a known polymer can be used. The liquid polymer can also be a commercially available polymer. Specific examples of the liquid polymer include liquid butadiene, a liquid styrene-butadiene copolymer, a liquid isoprene-butadiene copolymer, liquid isoprene, liquid hydrogenated isoprene, a liquid isoprene-styrene copolymer, and liquid isobutylene. Among these, from the viewpoint of allowing an elastic molded product that is a cured product of the polymer composition to exhibit excellent properties (for example, the Shore hardness, tensile strength at break, tensile elongation at break, compression set, and cyclic fatigue properties described later) while ensuring a viscosity suitable for stereolithography, liquid polymers crosslinkable by light irradiation and having an unsaturated bond such as a (meth) acryloyl group and a vinyl group, and liquid polymers having a cyclic ether, such as an epoxy compound and an oxetane compound are preferred. In particular, liquid polymers having a (meth)acryloyl group are preferred. The liquid polymer is particularly preferably liquid isoprene having a (meth)acryloyl group and liquid isobutylene having a (meth) acryloyl group from the viewpoint of improving the tensile strength at break and the tensile elongation at break of the elastic molded product. The polymer composition for stereolithography may contain a single liquid polymer or two or more liquid polymers.

The content of the liquid polymer in the polymer composition for stereolithography of the present invention is not particularly limited. From the viewpoint of allowing an elastic molded product that is a cured product of the polymer composition to exhibit excellent properties while ensuring a viscosity suitable for stereolithography in a room temperature environment, the content of the liquid polymer is, for example, 5 mass % or more, preferably 10 mass % or more, more preferably 15 mass % or more, still more preferably 20 mass % or more, particularly preferably 35 mass % or more. Further, from the same viewpoint, the upper limit of the content of the liquid polymer in the polymer composition for stereolithography of the present invention is, for example, 75 mass % or less, preferably 70 mass % or less, more preferably 65 mass % or less, still more preferably 60 mass % or less.

The polymer composition for stereolithography of the present invention may contain a polymer component (for example, a diluent polymer) different from the liquid polymer. From the viewpoint of allowing an elastic molded product that is a cured product of the polymer composition to exhibit excellent properties while ensuring a viscosity suitable for stereolithography in a room temperature environment, the content of the polymer component other than the liquid polymer is preferably 15 mass % or less, more preferably 10 mass % or less, still more preferably 5 mass % or less, particularly preferably 0 mass %.

The number average molecular weight (Mn) of the liquid polymer is not particularly limited. From the same viewpoint, the number average molecular weight of the liquid polymer is preferably 500 or more, more preferably about 5,000 to 500,000, still more preferably about 5,000 to 400,000, about 5,000 to 50,000, or about 5,000 to 40,000.

The number average molecular weight (Mn) of the liquid polymer is a value in terms of standard polystyrene, and is measured using a gel permeation chromatograph.

From the same viewpoint, the viscosity of the liquid polymer that is measured in an environment of a temperature of 25° C. and a relative humidity of 50% using an E-type viscometer under conditions of a cone plate diameter φ of 25 mm and a shear rate of 100 sec$^{-1}$ is preferably 100 to 1,000,000 mPa·s, more preferably 100 to 500,000 mPa·s, still more preferably 10,000 to 450,000 mPa·s.

The monomer contained in the polymer composition for stereolithography of the present invention is not particularly limited as long as it is a photopolymerizable monomer that is curable by light irradiation. Examples of the monomer include monofunctional monomers and polyfunctional monomers (for example, a bifunctional monomer, a bifunctional monomer, and a tetrafunctional monomer). From the viewpoint of allowing an elastic molded product that is a cured product of the polymer composition to exhibit excellent properties while ensuring a viscosity suitable for stereolithography, preferred examples of the monomer include monofunctional to tetrafunctional monomers. Use of a monofunctional monomer is preferred from the viewpoint of reducing the viscosity of the polymer composition for stereolithography in a room temperature environment. Use of a polyfunctional monomer is preferred from the viewpoint of allowing the elastic molded product to exhibit excellent properties. The monomer contained in the polymer composition for stereolithography of the present invention may be a single monomer or two or more monomers.

From the viewpoint of allowing an elastic molded product that is a cured product of the polymer composition to exhibit excellent properties while ensuring a viscosity suitable for stereolithography as well as excellent photocuring reactivity, the monomer preferably includes a (meth)acrylate.

Preferred examples of the monofunctional monomer include monofunctional acrylates. Specific examples of the monofunctional monomer include ethoxylated nonylphenol acrylate, methyl 2-allyloxymethyl acrylate, isostearyl acrylate, m-phenoxybenzyl acrylate, dicyclopentanyl acrylate, isobornyl acrylate, phenoxyethyl (meth)acrylate, phenoxy-2-methylethyl (meth)acrylate, phenoxyethoxyethyl (meth) acrylate, 3-phenoxy-2-hydroxypropyl (meth)acrylate, 2-phenylphenoxyethyl (meth)acrylate, 4-phenylphenoxyethyl (meth)acrylate, 3-(2-phenylphenyl)-2-hydroxypropyl (meth)acrylate, a (meth)acrylate of p-cumylphenol reacted with ethylene oxide, 2-bromophenoxyethyl (meth)acrylate, 2,4-dibromophenoxyethyl (meth)acrylate, 2,4,6-tribromophenoxyethyl (meth)acrylate, phenoxy (meth)acrylate modified with two or more moles of ethylene oxide or propylene oxide, isobornyl (meth)acrylate, bornyl (meth) acrylate, tricyclodecanyl (meth)acrylate, dicyclopentanyl (meth)acrylate, dicyclopentenyl (meth)acrylate, cyclohexyl (meth)acrylate, 4-butylcyclohexyl (meth)acrylate, acryloyl morpholine, 2-hydroxyethyl (meth)acrylate, 2-hydroxypropyl (meth)acrylate, 2-hydroxybutyl (meth)acrylate, methyl (meth)acrylate, ethyl (meth)acrylate, propyl (meth)acrylate, isopropyl (meth)acrylate, butyl (meth)acrylate, isobutyl (meth)acrylate, t-butyl (meth)acrylate, amyl (meth)acrylate, isoamyl (meth)acrylate, hexyl (meth)acrylate, heptyl (meth) acrylate, octyl (meth)acrylate, 2-ethylhexyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, lauryl (meth)acrylate, stearyl (meth)acrylate, isostearyl (meth)acrylate, tetrahydrofurfuryl (meth)acrylate, butoxyethyl (meth)acrylate, ethoxydiethylene glycol (meth)acrylate, polyethylene glycol mono(meth) acrylate, polypropylene glycol mono(meth)acrylate, methoxyethylene glycol (meth)acrylate, ethoxyethyl (meth) acrylate, methoxypolyethylene glycol (meth)acrylate, methoxypolypropylene glycol (meth)acrylate, diacetone (meth)acrylamide, isobutoxy methyl (meth)acrylamide, N,N-dimethyl (meth)acrylamide, t-octyl (meth)acrylamide, dimethylaminoethyl (meth)acrylate, diethylaminoethyl (meth)acrylate, 7-amino-3,7-dimethyloctyl (meth)acrylate, N,N-diethyl (meth)acrylamide, N,N-dimethylaminopropyl (meth)acrylamide, hydroxybutyl vinyl ether, lauryl vinyl ether, cetyl vinyl ether, 2-ethylhexyl vinyl ether, polyoxyethylene nonylphenyl ether (meth)acrylate, and vinyl monomers (for example, N-vinylpyrrolidone, N-vinylcaprolactam, vinylimidazole, and vinylpyridine).

Specific examples of the polyfunctional monomer include polyethylene glycol di(meth)acrylate, dipropylene glycol diacrylate, propoxylated pentyl glycol diacrylate, propoxylated glyceryl triacrylate, trimethylolpropane tri(meth)acrylate, pentaerythritol tri(meth)acrylate, pentaerythritol tetra (meth)acrylate, ethylene glycol di(meth)acrylate, tetraethylene glycol di(meth)acrylate, polypropylene glycol di(meth)acrylate, 1,4-butanediol di(meth)acrylate, 1,6- hexanediol di(meth)acrylate, neopentyl glycol di(meth)acrylate, trimethylolpropane trioxyethyl (meth)acrylate, tris(2-hydroxyethyl) isocyanurate tri(meth)acrylate, tris(acryloyloxy) isocyanurate, bis(hydroxymethyl) tricyclodecane di(meth)acrylate, dipentaerythritol hexa(meth)acrylate, a di(meth)acrylate of a diol that is an adduct of bisphenol A with polyethylene oxide or propylene oxide, a di(meth)acrylate of a diol that is an adduct of hydrogenated bisphenol A with ethylene oxide or propylene oxide, epoxy (meth)acrylate obtained by adding a (meth)acrylate to diglycidyl ether of bisphenol A, and triethylene glycol divinyl ether.

From the viewpoint of allowing an elastic molded product that is a cured product of the polymer composition to exhibit excellent properties while ensuring a viscosity suitable for stereolithography in a room temperature environment, the polymer composition for stereolithography of the present invention preferably has a percentage of the monomer of, for example, 95 mass % or less, preferably about 30 to 85 mass %, more preferably about 40 to 80 mass %, still more preferably about 50 to 70 mass % based on 100 mass % in total of the liquid polymer and the monomer. A higher percentage of the monomer (and the oligomer described later) in the polymer composition for stereolithography reduces the compression set of the elastic molded product.

The polymer composition for stereolithography of the present invention may further contain an oligomer, and preferably contains an oligomer. An "oligomer" is a polymer including, for example, about 10 to 100 monomers bonded together. The oligomer contained in the polymer composition for stereolithography of the present invention is not particularly limited as long as it is curable by light irradiation. The oligomer preferably includes a (meth)acrylate. For example, urethane (meth)acrylate (an oligomer obtained by reacting an isocyanate group with a hydroxyl group and having a urethane bond and an acrylic group) and epoxy (meth)acrylate (an oligomer obtained by reacting an epoxy resin with (meth)acrylic acid) are suitable, and other oligomers to which a (meth)acrylate is added can also be used. The oligomer used may be a single oligomer or two or more oligomers in combination.

When the polymer composition for stereolithography of the present invention contains an oligomer, from the viewpoint of allowing an elastic molded product that is a cured product of the polymer composition to exhibit excellent properties while ensuring a viscosity suitable for stereolithography in a room temperature environment, the polymer composition for stereolithography of the present invention preferably has a percentage of the oligomer of about 30 to 90 mass %, more preferably about 40 to 80 mass %, still more preferably about 50 to 70 mass % based on 100 mass % in total of the liquid polymer, the monomer, and tire oligomer. Presence of the oligomer in the polymer composition for stereolithography can reduce the compression set of the elastic molded product. When the polymer composition for stereolithography of the present invention contains an oligomer, from the viewpoint of allowing an elastic molded product that is a cured product of the polymer composition to exhibit excellent properties while ensuring a viscosity suitable for stereolithography in a room temperature environment, the polymer composition for stereolithography of the present invention preferably has a total percentage of the monomer and the oligomer of about 30 to 90 mass %, more preferably about 40 to 80 mass %, still more preferably about 50 to 70 mass % based on 100 mass % in total of the liquid polymer, the monomer, and the oligomer. As described above, a higher percentage of the monomer and the oligomer in the polymer composition for stereolithography reduces the compression set of the elastic molded product.

In the polymer composition for stereolithography of the present invention, the monomer and the oligomer each serve as a reactive diluent that adjusts the properties of the cured elastic molded product while adjusting the viscosity in a room temperature environment.

The polymer composition for stereolithography of the present invention preferably contains a photopolymerization initiator. Addition of the photopolymerization initiator promotes the curing of the above-mentioned polymer composition for stereolithography. The photopolymerization initiator is not particularly limited, and a known photopolymerization initiator that generates radicals by light irradiation can be used. Examples of suitable photopolymerization initiators include alkylphenone photopolymerization initiators (for example, 2-hydroxy-2-methylpropiophenone, 2,2-dimethoxy-2-phenylacetophenone, 1-hydroxycyclohexyl phenyl ketone, 2-hydroxy-4'-(2-hydroxyethoxy)-2-methylpropiophenone, 2-(4-(methylthio)benzoyl)-2-(4-morpholinyl)propane, 2-(dimethylamino)-1-(4-morpholinophenyl)-2-benzyl-1-butanone, and 2-(dimethylamino)-2-(4-methylbenzyl)-1-(4-morpholinophenyl)butan-1-one), acylphosphine oxide photopolymerization initiators (for example, bis(2,4,6-trimethylbenzoyl)phenylphosphine oxide and 2,4,6-trimethylbenzoyl-diphenyl phosphine oxide), and oxime ester photopolymerization initiators (for example, 1,2-octanedione,1-(4-(phenylthio)-,2-(O-benzoyloxime)) and ethanone,1-(9-ethyl-6-(2-methylbenzoyl)-9H-carbazol-3-yl)-,1-(O-acetyloxime)). In a stereolithography technique, a light source having a peak wavelength of light intensity in a wavelength region of 390 nm to 410 nm, in particular, a light source having a peak wavelength of light intensity in a wavelength region of 405 nm is mainly used. Therefore, it is preferable that the photopolymerization initiator be one that initiates radical polymerization of the polymer composition for stereolithography by light irradiation from such a light source. The photopolymerization initiator used may be a single photopolymerization initiator or two or more photopolymerization initiators in combination. From the viewpoint of suitably curing the polymer composition for stereolithography in a stereolithography technique in which the light source as described above is used, the polymer composition for stereolithography of the present invention preferably contains at least two photopolymerization initiators different in absorption band. For example, it is preferred to use a photopolymerization initiator having an absorption band in a wavelength region of 405 nm and a photopolymerization initiator having an absorption band in a wavelength region of 300 to 380 nm in combination.

The content of the photopolymerization initiator is preferably about 0.5 to 10 parts by mass, more preferably about 1 to 7 parts by mass based on 100 parts by mass of the liquid polymer.

The polymer composition for stereolithography of the present invention may further contain various additives as long as the effects of the present invention are not impaired. The additives are not particularly limited, and examples thereof include known additives added to the composition for stereolithography, such as diluent polymers, photosensitizers, fillers, UV blockers, dyes, pigments, leveling agents, flow regulators, defoamers, plasticizers, polymerization inhibitors, flame retardants, dispersion stabilizers, storage stabilizers, antioxidants, metals, metal oxides, metal salts, and ceramics. The additive contained in the polymer composition for stereolithography of the present invention may be a single additive or two or more additives. The total of content rates of additives contained in the polymer composition for stereolithography is preferably 5 mass % or less, more preferably 3 mass % or less, and may be 0 mass %.

The polymer composition for stereolithography of the present invention can be easily produced by mixing the liquid polymer, the monomer, and the oligomer, the photopolymerization initiator, and various additives that are optionally added.

<Elastic Molded Product>

The elastic molded product of the present invention is a cured product of the above-mentioned polymer composition for stereolithography. Specifically, the elastic molded product is obtained by curing the polymer composition for stereolithography by light irradiation.

The elastic molded product of the present invention may have a Shore A hardness appropriately determined according to the hardness required of a final product. The Shore A hardness is preferably 25 or more, more preferably within the range of 25 to 90 from the viewpoint of exhibiting excellent properties. That is, as for the polymer composition for stereolithography of the present invention, it is preferable that an elastic molded product (having a shape of a compressed ball of a diameter φ of 29×12.5 mm according to JIS K6262:2013) produced from the polymer composition by DLP stereolithography under conditions of a temperature of 25° C., a UV wavelength of 405 nm, a lamination pitch of 0.05 mm, a UV irradiation time of 20 seconds per layer, and a UV illuminance of 5.0 mW/cm$^2$ have a Shore A hardness of 25 or more, more preferably 25 to 90. In the present invention, the Shore A hardness of the elastic molded product is a value measured according to the method prescribed in JIS K6253-3:2012.

The tensile strength at break of the elastic molded product of the present invention may be appropriately determined according to the tensile strength at break required of a final product, and is preferably 5.0 MPa or more, more preferably 5.5 MPa or more. That is, as for the polymer composition for stereolithography of the present invention, it is preferable that an elastic molded product (having a shape of a dumbbell No. 3 test piece according to JIS K6251:2017) produced from the polymer composition by DLP stereolithography insider conditions of a temperature of 25° C., a UV wavelength of 405 nm, a lamination pitch of 0.05 mm, a UV irradiation time of 20 seconds per layer, and a UV illuminance of 5.0 mW/cm$^2$ have a tensile strength at break of 5.0 MPa or more, more preferably 5.5 MPa or more. In the present invention, the tensile strength at break of the elastic molded product is a value measured according to the method prescribed in JIS K6251:2017. The upper limit of the tensile strength at break of the elastic molded product is, for example, 50 MPa or less, or 15.0 MPa or less.

The tensile elongation at break of the elastic molded product of the present invention may be appropriately determined according to the tensile elongation at break required of a final product, and is preferably 30% or more, more preferably 70% or more, still more preferably 100% or more. That is, as for the polymer composition for stereolithography of the present invention, it is preferable that an elastic molded product (having a shape of a dumbbell No. 3 test piece according to JIS K6251:2017) produced from the polymer composition by DLP stereolithography under conditions of a temperature of 25° C., a UV wavelength of 405 nm, a lamination pitch of 0.05 mm, a UV irradiation time of 20 seconds per layer, and a UV illuminance of 5.0 mW/cm$^2$ have a tensile elongation at break of 30% or more, more preferably 70% or more, still more preferably 100% or more. In the present invention, the tensile elongation at break of the elastic molded product is a value measured according to the method prescribed in JIS K6251:2017. The upper limit of the tensile elongation at break of the elastic molded product is, for example, 1000% or less.

The compression set of the elastic molded product of the present invention may be appropriately determined according to the compression set required of a final product. However, from the viewpoint of exhibiting excellent properties, the compression set which is measured after a lapse of 0.5 hours from the process of compressing the elastic molded product by 25% at a temperature of 23° C. for 22 hours and then releasing the compression according to the method prescribed in JIS K6262:2013, is preferably 10% or less, more preferably 7% or less, still more preferably 5% or less. That is, as for the polymer composition for stereolithography of the present invention, it is preferable that an elastic molded product (having a shape of a compressed ball of a diameter φ of 29×12.5 mm according to JIS K6262:2013) produced from the polymer composition by DLP stereolithography under conditions of a temperature of 25° C., a UV wavelength of 405 nm, a lamination pitch of 0.05 mm, a UV irradiation time of 20 seconds per layer, and a UV illuminance of 5.0 mW/cm$^2$ have a compression set of 10% or less, more preferably 7% or less, still more preferably 5% or less.

The shape of the elastic molded product of the present invention is not particularly limited, and the polymer composition for stereolithography can be formed into a desired shape by stereolithography.

The method for producing the elastic molded product of the present invention is not particularly limited, and the elastic molded product can be produced by a known stereolithography technique using the above-mentioned polymer composition for stereolithography as a raw material. The details of the method for producing the elastic molded product of the present invention are as described in the following section of <Method for producing elastic molded product>.

<Method for Producing Elastic Molded Product>

The method for producing the elastic molded product of the present invention can be suitably perforated by using, in a conventionally known stereolithography technique in which a liquid resin is used as a raw material, the polymer composition for stereolithography of the present invention instead of a liquid resin. Specifically, for example, in various stereolithography techniques such as Stereolithography Apparatus (SLA), Digital Light Processing (DLP), and Liquid Crystal Display (LCD), the elastic molded product can be produced from the polymer composition for stereolithography of the present invention as a raw material instead of a liquid resin.

The elastic molded product of the present invention can be suitably produced, for example, by a method including: supplying the polymer composition for stereolithography of the present invention onto a molding table, and curing the polymer composition for stereolithography by light irradiation to form a first layer of a cured product, supplying, onto the first layer of the cured product, the polymer composition for stereolithography for forming a second layer of a cured product, and curing the polymer composition for stereolithography by light irradiation to form the second layer of the cured product; and repeating a step similar to the step of flaming the second layer of the cured product until an N-th layer is formed to produce an elastic molded product (stereolithography product) having a three-dimensional shape. In the stereolithography technique, a known 3D printer can be used, and the 3D printer can be a commercially available product.

In the stereolithography technique, the thickness of one layer in the laminate during curing of the polymer composition for stereolithography is, for example, about 0.01 to 0.5 mm. The emitted light is generally ultraviolet light, and preferably includes light having a wavelength of 405 nm. Further, the illuminance of the emitted light is generally about 0.1 to 100 mW/cm$^2$ in a measurement wavelength range of 405 nm. The light irradiation time for curing one layer of the polymer composition for stereolithography varies depending on the type of stereolithography, and is appropriately adjusted. For example, in the case of the DLP stereolithography, the light irradiation time is about 1 to 60 seconds. The elastic molded product of the present invention is preferably produced in an environment around room temperature (for example, 20 to 30° C.).

After the above-mentioned stereolithography, optionally, a general secondary treatment such as irradiation with a high-pressure mercury lamp, irradiation with a metal halide lamp, irradiation with a UV-LED, and heating can be additionally performed. These secondary treatments can modify the surface after stereolithography, improve the strength, and promote the curing. The secondary treatment may be performed together with stereolithography, although it is not always necessary depending on the conditions of stereolithography.

EXAMPLES

Hereinafter, examples of the present invention will be described. However, the present invention is not limited to the following examples. Details of materials used in the examples and comparative examples are shown in Table 1.

TABLE 1

| | | Material | Product name | Manufacturer | Number average molecular weight (Mn) | Viscosity at 25° C. mPa · s |
|---|---|---|---|---|---|---|
| Liquid polymer | Methacryloyl group-containing liquid polymer | ester compound (98%) of maleic anhydride adduct of isoprene polymer and 2-hydroxyethyl methacrylate polyisobutylene having acryloyl groups or both terminals | UC-102M | KURARAY CO., LTD. | 17,000 | 60,000 |
| | | | UC-203M | | 35,000 | 400,000 |
| | | | EP400V | KANEKA CORPORATION | 90,000 | 1,000,000 |
| Monomer | Monofunctional acrylate | ethoxylated nonylphenol acrylate | SR504 | ARKEMA K.K. | 450 | 100 |
| | | methyl 2-allyloxymethyl acrylate | AOMA | NIPPON SHOKUBAI CO., LTD. | 156 | 1.6 |
| | | isostearyl acrylate | ISTA | OSAKA ORGANIC CHEMICAL INDUSTRY LTD. | 324 | 17 |
| | | m-phenoxybenzyl acrylate | LIGHT ACRYLATE POB-A | KYOEISHA CHEMICAL Co., LTD. | 254 | 15 |
| | | dicyclopentanyl acrylate | FA-513AS | Hitachi Chemical Company, Ltd. | 206 | 17 |
| | | isobornyl acrylate | IBXA | OSAKA ORGANIC CHEMICAL INDUSTRY LTD. | 208 | 9 |
| | Bifunctional acrylate | polyethylene glycol diacrylate | SR344 | ARKEMA K.K. | 508 | 57 |
| | | dipropylene glycol diacrylate | SR508 | | 242 | 10 |
| | | propoxylated neopentyl glycol diacrylate | SR9003 | | 328 | 15 |
| | Trifunctional acrylate | propoxylated glyceryl triacrylate | SR9020 | | 428 | 95 |
| Oligomer | Urethane acrylate | aromatic urethane acrylate oligomer | CN992 | | — | 5,000 |
| | | aliphatic urethane acrylate oligomer | CN966 | | — | 60,000 |
| | | aliphatic urethane acrylate oligomer | CN8881 | | 4,000 | 200,000 |
| | | polyurethane acrylate/acrylic monomer | BEAMSET 505A-6 | ARAKAWA CHEMICAL INDUSTRIES, LTD. | — | 170,000 |
| Diluent polymer | Liquid BR | butadiene polymer compound | L-BR302 | KURARAY CO., LTD. | 5,500 | 1,200 |
| Photopolymerization initiator | Alkylphenone | 2-hydroxy-2-methylpropiophenone | Omnirad (Irgacure) 1173 | BASF SE | 164 | 25 |
| | Acylphosphine oxide | Bis(2,4,6-trimethylbenzoyl)phenylphosphine oxide | Omnirad (Irgacure) 819 | | 419 | — |
| | Monoacylphosphine oxide | 2,4,6-trimethylbenzoyl-diphenyl phosphine oxide | Omnirad (Irgacure) TPO | | 348 | — |
| Photosensitizer | Thioxanthone | 2-isopropylthioxanthone | ITX | Tokyo Chemical Industry Co., Ltd. | — | — |
| | Benzophenone | 4,4'-bis(diethylamino)benzophenone | EMK: TR-EMK | CHANGZHOU TRONLY | — | — |
| | Acridine | 9-phenylacridine | 9-PA: TR-PAG-101 | NEW ELECTRONIC MATERIALS CO., LTD. (Changzhou, China) | — | — |
| | Anthracene | 9,10-bis(octanoyloxy)anthracene | DBA: ANTHRACURE UVS-581 | Kawasaki Kasei Chemicals Ltd. | — | — |
| UV blocker | | 2,2'-(2,5-thiophenediyl)bis(5-tert-butylbenzoxazole) | Mayzo, Inc. | Mayzo, Inc. | — | — |

TABLE 1-continued

| Material | | | Product name | Manufacturer | Number average molecular weight (Mn) | Viscosity at 25° C. mPa · s |
|---|---|---|---|---|---|---|
| Vulcanized rubber | Pulverized vulcanized rubber (particle size: 85 μm) | SBR compound | VR-1 | SRI | — | — |
| Filler | Silica | | Nipsil VN3 | Tosoh Corporation | — | — |
| Coupling agent | Silane coupling agent | | Y9936 | Momentive Performance Materials Inc. | — | — |

Examples 1 to 31 and Comparative Examples 1 to 6

(Production of Polymer Compositions for Stereolithography)

The materials were mixed and defoamed with a planetary centrifugal mixer at each mixing ratio (parts by mass) shown in Tables 2 to 4 to produce a polymer composition for stereolithography. The components were uniformly mixed. In Tables 2 to 4, "–" indicates that the relevant component is not added.

(Viscosity of Polymer Compositions for Stereolithography)

As for each polymer composition for stereolithography obtained in each of the examples and comparative examples, the viscosity was measured in an environment of a temperature of 25° C. (with an error of ±2° C.) and a relative humidity of 50% using an E-type viscometer (MCR301 manufactured by Anton Paar GmbH) under conditions of a cone plate diameter φ of 25 mm and a shear rate of 100 sec$^{-1}$. The results are shown in Tables 2 to 4.

(Production of Elastic Molded Products)

Using each polymer composition for stereolithography obtained in each of the examples and comparative examples, elastic molded products were produced by DLP stereolithography. Specifically, using a 3D printer equipped with a light source (UV-LED) having a peak wavelength of 405 nm, elastic molded products were produced under conditions of a temperature of 25° C., a lamination pitch of 0.05 mm, an irradiation time of 20 seconds per layer, and an illuminance of 5.0 mW/cm$^2$ at the wavelength of 405 nm. In each of the examples and comparative examples, elastic molded products having three types of shapes were produced. The first one is an elastic molded product having a shape of a dumbbell No. 3 test piece according to JIS K6251:2017 used in the tensile test described later, the second one is an elastic molded product having a shape of a compressed ball of a diameter φ of 29×12.5 mm according to JIS K6262:2013 used in the measurement of the hardness and compression set described later, and the third one is an elastic molded product test piece according to JIS K6260:2017 (dimensions: length of 150 mm, width of 25 mm, radius of curvature of central groove of 2.38 mm, and thickness of 6.3 mm) used in the cyclic fatigue test described later.

Note, however, that no elastic molded product was produced from the polymer compositions for stereolithography obtained in Comparative Examples 1 to 6 under the above-mentioned conditions due to high viscosity. Therefore, elastic molded products were obtained by increasing the temperature of the liquid composition to 40 to 80° C. to lower the apparent viscosity, or changing the up-down length of the stage during formation of one layer to about 10 times the normal length to form the layer at a speed of one-tenth the normal speed. When a commercially available 3D printer is used as it is, it is difficult to produce the elastic molded products of Comparative Examples 1 to 6 under such conditions. Even if the elastic molded products can be produced, the productivity is very low. Further, since the upper limit of the temperature control in a commercially available 3D printer is about 30° C., it is difficult to produce the elastic molded products of Comparative Examples 1 to 6 using a commercially available 3D printer.

(Hardness of Elastic Molded Products)

As for the elastic molded products (having a shape of a compressed ball of a diameter φ of 29×12.5 mm according to JIS K6252:2013) obtained in the examples and comparative examples, the Shore A hardness was measured according to the method prescribed in JOS K6253-3:2012. The results are shown in Tables 2 to 4.

(Tensile Test of Elastic Molded Products)

As for the elastic molded products (having a shape of a dumbbell No. 3 test piece according to JIS K6251:2017) obtained in the examples and comparative examples, the tensile strength at break and the tensile elongation at break were measured according to the prescription of JIS K6251:2017. The results are shown in Tables 2 to 4. It is determined that the larger the value of the tensile strength at break is, the higher the strength of the elastic molded product is, and the larger the value of the tensile elongation at break is, the easier the elastic molded product is to be elongated and the better the mechanical properties of the elastic molded product are.

(Compression Set)

The elastic molded products (having a shape of a compressed ball of a diameter φ of 29×12.5 mm according to JIS K6262:2013) obtained in the examples and comparative examples were compressed by 25% at a temperature of 23° C. for 22 hours, the compression was released, and then the compression set was measured after a lapse of 0.5 hours from the above-mentioned process according to the prescription of JIS K6262:2013. The results are shown in Tables 2 to 4. It is determined that the smaller the value of the compression set is, the better the restoring force of the elastic molded product is.

(Cyclic Fatigue Test)

The elastic molded products (test pieces according to JIS K6260:2017 (dimensions: length of 150 mm, width of 25 mm, radius of curvature of central groove of 2.38 mm, and thickness of 6.3 mm)) obtained in the examples and comparative examples were subjected to a cyclic fatigue test using a DeMattia flex tester according to the prescription of JIS K6260:2017. A cut was made in the central groove of the test piece, and the test piece was repeatedly flexed at 5 Hz with a strain of 50% applied to the central groove. The degree of growth of the crack during the flexing was measured. The crack growth (times/mm) is calculated by the following equation. The number of flexes until the crack grew by 1 mm was counted. The results are shown in Tables 2 to 4. It is determined that the larger the value is, the longer it takes for the crack to grow by 1 mm, and the better the result of the cyclic fatigue test (flexural crack growth resistance) is.

Crack growth (times/mm)=number of flexes (times)/length of crack (mm)

(Production Time of Elastic Molded Products)

The time taken for the production of the elastic molded product (molding time for producing a 2-mm-thick sample) was measured. The results are shown in Tables 2 to 4, in which "very good" means a production time of 25 minutes or less, "good" means a production time more than 25 minutes and 60 minutes or less, and "poor" means a production time of 60 minutes or more or that no elastic molded product was produced by DLP stereolithography.

TABLE 2

| | | | | Examples | | | | | | | |
|---|---|---|---|---|---|---|---|---|---|---|---|
| | | | | 1 | 2 | 3 | 4 | 5 | 6 | 7 | 8 |
| Polymer composition for stereolithography | Liquid polymer | Methacryloyl group-containing liquid polymer | UC102M (isoprene skeleton) | 50 | 15 | 70 | 50 | 50 | 50 | 50 | 50 |
| | | | UC203M (isoprene skeleton) | — | — | — | — | — | — | — | — |
| | Monomer | Monofunctional acrylate | ethoxylated nonylphenol acrylate | 50 | 85 | 30 | — | — | — | — | — |
| | | | methyl 2-allyloxymethyl acrylate | — | — | — | 50 | — | — | — | — |
| | | | isostearyl acrylate | — | — | — | — | 50 | — | — | — |
| | | | m-phenoxybenzyl acrylate | — | — | — | — | — | 50 | — | — |
| | | | dicyclopentanyl acrylate | — | — | — | — | — | — | 50 | — |
| | | | isobornyl acrylate | — | — | — | — | — | — | — | 50 |
| | | Bifunctional acrylate | polyethylene glycol diacrylate | — | — | — | — | — | — | — | — |
| | | | dipropylene glycol diacrylate | — | — | — | — | — | — | — | — |
| | | | propoxylated neopentyl glycol diacrylate | — | — | — | — | — | — | — | — |
| | | Trifunctional acrylate | propoxylated glyceryl triacrylate | — | — | — | — | — | — | — | — |
| | Oligomer | Urethane acrylate | aromatic urethane acrylate oligomer | — | — | — | — | — | — | — | — |
| | | | aliphatic urethane acrylate oligomer | — | — | — | — | — | — | — | — |
| | | | polyurethane acrylate/ acrylic monomer | — | — | — | — | — | — | — | — |
| | Diluent polymer | Liquid BR | butadiene polymer compound | — | — | — | — | — | — | — | — |
| Photopolymerization initiator | Alkylphenone | 2-hydroxy-2-methyl-propiophenone | | 1.5 | 1.5 | 1,5 | 1.5 | 1.5 | 1.5 | 1.5 | 1.5 |
| | Acylphosphine oxide | Bis(2,4,6-trimethylbenzoyl)phenylphosphine oxide | | 0.3 | 0.3 | 0.3 | 0.3 | 0.3 | 0.3 | 0.3 | 0.3 |
| | Monoacylphosphine oxide | 2,4,6-trimethylbenzoyl-diphenyl phosphine oxide | | — | — | — | — | — | — | — | — |

TABLE 2-continued

|  |  |  |  |  |  |  |  |  |  |  |
|---|---|---|---|---|---|---|---|---|---|---|
|  | Photo-sensitizer | Thio-xanthone | 2-isopropylthio-xanthone | — | — | — | — | — | — | — | — |
|  |  | Benzo-phenone | 4,4'-bis(diethyl-amino)benzo-phenone | — | — | — | — | — | — | — | — |
|  |  | Acridine | 9-phenyl-acridine | — | — | — | — | — | — | — | — |
|  |  | Anthra-cene | 9,10-bis(octa-noyloxy)anthra-cene | — | — | — | — | — | — | — | — |
|  | UV blocker |  | 2,2'-(2,5-thiophene-diyl)bis(5-tert-butyl-benzoxazole) | — | — | — | — | — | — | — | — |
|  | Vulcanized rubber | Pulverized vulcanized rubber (particle size: 85 μm) | SBR compound | — | — | — | — | — | — | — | — |
|  | Filler | Silica |  | — | — | — | — | — | — | — | — |
|  | Coupling agent | Silane coupling agent |  | — | — | — | — | — | — | — | — |
|  | Viscosity at 23° C. | mPa × s |  | 1,800 | 100 | 3,000 | 1,200 | 1,400 | 1,400 | 1,400 | 1,300 |
| Elastic molded product | Hardness (Shore A) |  |  | 53 | 58 | 49 | 62 | 54 | 52 | 65 | 63 |
|  | Tensile strength at break (MPa) |  |  | 6.5 | 7.8 | 5.8 | 7.2 | 6.7 | 6.3 | 11.0 | 10.5 |
|  | Tensile elongation at break (%) |  |  | 140 | 70 | 180 | 110 | 120 | 100 | 110 | 130 |
|  | Compression set (%) |  |  | 3.0 | 3.5 | 2.2 | 3.2 | 2.9 | 2.8 | 3.3 | 3.2 |
|  | Cyclic fatigue (crack growth (times/min)) |  |  | 8,000 | 500 | 11,000 | 6,000 | 8,000 | 8,000 | 6,000 | 6,000 |
|  | Production time |  |  | very good | very good | good | very good | very good | very good | very good | very good |

|  |  |  |  | Examples |  |  |  |  |  |  |
|---|---|---|---|---|---|---|---|---|---|---|
|  |  |  |  | 9 | 10 | 11 | 12 | 13 | 14 | 15 |
| Polymer composition for stereolithography | Liquid polymer | Methac-ryloyl group-containing liquid polymer | UC102M (isoprene skeleton) | 50 | 50 | 50 | 50 | 50 | 50 | — |
|  |  |  | UC203M (isoprene skeleton) | — | — | — | — | — | — | 50 |
|  | Monomer | Mono-func-tional acrylate | ethoxylated nonylphenol acrylate | 30 | 30 | 30 | 40 | 45 | 45 | 50 |
|  |  |  | methyl 2-allyloxymethyl acrylate | — | — | — | — | — | — | — |
|  |  |  | isostearyl acrylate | — | — | — | — | — | — | — |
|  |  |  | m-phenoxybenzyl acrylate | — | — | — | — | — | — | — |
|  |  |  | dicyclopentanyl acrylate | — | — | — | — | — | — | — |
|  |  |  | isobornyl acrylate | — | — | — | — | — | — | — |
|  |  | Bifunc-tional acrylate | polyethylene glycol diacrylate | 20 | — | — | — | — | — | — |
|  |  |  | dipropylene glycol diacrylate | — | 20 | — | — | — | — | — |
|  |  |  | propoxylated neopentyl glycol diacrylate | — | — | 20 | — | — | — | — |
|  |  | Trifunc-tional acrylate | propoxylated glyceryl triacrylate | — | — | — | 10 | — | — | — |
|  | Oligomer | Urethane acrylate | aromatic urethane acrylate oligomer | — | — | — | — | 5 | — | — |
|  |  |  | aliphatic urethane acrylate oligomer | — | — | — | — | — | 5 | — |

TABLE 2-continued

|  |  |  | polyurethane acrylate/ acrylic monomer | — | — | — | — | — | — | — |
|---|---|---|---|---|---|---|---|---|---|---|
|  | Diluent polymer | Liquid BR | butadiene polymer compound | — | — | — | — | — | — | — |
|  | Photo-polymer-ization initiator | Alkyl-phenone | 2-hydroxy-2-methyl-propiophenone | 15 | 1.5 | 1.5 | 1.5 | 1.5 | 1.5 | 1.5 |
|  |  | Acylphos-phine oxide | Bis(2,4,6-trimethylben-zoyl)phenylphos-phine oxide | 0.3 | 0.3 | 0.3 | 0.3 | 0.3 | 0.3 | 0.3 |
|  |  | Mono-acylphos-phine oxide | 2,4,6-trimethylben-zoyl-diphenyl phosphine oxide | — | — | — | — | — | — | — |
|  | Photo-sensitizer | Thio-xanthone | 2-isopropylthio-xanthone | — | — | — | — | — | — | — |
|  |  | Benzo-phenone | 4,4'-bis(diethyl-amino)benzo-phenone | — | — | — | — | — | — | — |
|  |  | Acridine | 9-phenyl-acridine | — | — | — | — | — | — | — |
|  |  | Anthra-cene | 9,10-bis(octa-noyloxy)anthra-cene | — | — | — | — | — | — | — |
|  | UV blocker |  | 2,2'-(2,5-thiophene-diyl)bis(5-tert-butyl-benzoxazole) | — | — | — | — | — | — | — |
|  | Vulcanized rubber | Pulverized vulcanized rubber (particle size: 85 μm) | SBR compound | — | — | — | — | — | — | — |
|  | Filler | Silica |  | — | — | — | — | — | — | — |
|  | Coupling agent | Silane coupling agent |  | — | — | — | — | — | — | — |
|  | Viscosity at 23° C. | mPa · s |  | 1,500 | 1,300 | 1,300 | 1,800 | 2,100 | 2,500 | 2,300 |
| Elastic molded product | Hardness (Shore A) |  |  | 53 | 58 | 54 | 53 | 54 | 52 | 55 |
|  | Tensile strength at break (MPa) |  |  | 6.7 | 9.5 | 7.3 | 7.5 | 7.0 | 6.3 | 6.8 |
|  | Tensile elongation at break (%) |  |  | 160 | 130 | 120 | 150 | 150 | 170 | 190 |
|  | Compression set (%) |  |  | 3.0 | 3.3 | 3.1 | 3.0 | 3.1 | 2.9 | 2.5 |
|  | Cyclic fatigue (crack growth (times/min)) |  |  | 8,000 | 6,000 | 8,000 | 8,000 | 11,000 | 11,000 | 11,000 |
|  | Production time |  |  | very good | very good | very good | very good | very good | very good | very good |

TABLE 3

|  |  |  |  | Examples |  |  |  |  |  |  |
|---|---|---|---|---|---|---|---|---|---|---|
|  |  |  |  | 16 | 17 | 18 | 19 | 20 | 21 | 22 |
| Polymer composi-tion for stereoli-thography | Liquid polymer | Methac-ryloyl group-containing liquid polymer | UC102M (isoprene skeleton) | — | 50 | 50 | 50 | 50 | 50 | 50 |
|  |  | Liquid polymer | UC203M (isoprene skeleton) | 50 | — | — | — | — | — | — |
|  | Monomer | Mono-func-tional acrylate | ethoxylated nonylphenol acrylate | 50 | 50 | 50 | 50 | 50 | 50 | 50 |
|  |  |  | methyl 2-allyloxymethyl acrylate | — | — | — | — | — | — | — |
|  |  |  | isostearyl acrylate | — | — | — | — | — | — | — |
|  |  |  | m-phenoxybenzyl acrylate | — | — | — | — | — | — | — |

TABLE 3-continued

| | | | | | | | | | |
|---|---|---|---|---|---|---|---|---|---|
| | | | dicyclopentanyl acrylate | — | — | — | — | — | — | — |
| | | | isobornyl acrylate | — | — | — | — | — | — | — |
| | | Bifunctional acrylate | polyethylene glycol diacrylate | — | — | — | — | — | — | — |
| | | | dipropylene glycol diacrylate | — | — | — | — | — | — | — |
| | | | propoxylated neopentyl glycol diacrylate | — | — | — | — | — | — | — |
| | | Trifunctional acrylate | propoxylated glyceryl triacrylate | — | — | — | — | — | — | — |
| | Oligomer | Urethane acrylate | aromatic urethane acrylate oligomer | — | — | — | — | — | — | — |
| | | | aliphatic urethane acrylate oligomer | — | — | — | — | — | — | — |
| | | | polyurethane acrylate/ acrylic monomer | — | — | — | — | — | — | — |
| | Diluent polymer | Liquid BR | butadiene polymer compound | 10 | — | — | — | — | — | — |
| | Photopolymerization initiator | Alkylphenone | 2-hydroxy-2-methyl-propiophenone | 1.5 | 1.5 | 1.5 | 1.5 | 1.5 | 1.5 | 1.5 |
| | | Acylphosphine oxide | Bis(2,4,6-trimethylbenzoyl)phenylphosphine oxide | 0.3 | — | 0.3 | 0.3 | 0.3 | 0.3 | 0.3 |
| | | Monoacylphosphine oxide | 2,4,6-trimethylbenzoyl-diphenyl phosphine oxide | — | 0.6 | — | — | — | — | — |
| | Photosensitizer | Thioxanthone | 2-isopropylthioxanthone | — | — | 0.05 | — | — | — | — |
| | | Benzophenone | 4,4'-bis(diethylamino)benzophenone | — | — | — | 0.05 | — | — | — |
| | | Acridine | 9-phenyl-acridine | — | — | — | — | 0.05 | — | — |
| | | Anthracene | 9,10-bis(octanoyloxy)anthracene | — | — | — | — | — | 0.05 | — |
| | UV blocker | | 2,2'-(2,5-thiophenediyl)bis(5-tert-butyl-benzoxazole) | — | — | — | — | — | — | 0.01 |
| | Vulcanized rubber | Pulverized vulcanized rubber (particle size: 85 μm) | SBR compound | — | — | — | — | — | — | — |
| | Filler | Silica | | — | — | — | — | — | — | — |
| | Coupling agent | Silane coupling agent | | — | — | — | — | — | — | — |
| | Viscosity at 23° C. | mPa · s | | 2,000 | 1,800 | 1,800 | 1,800 | 1,800 | 1,800 | 1,800 |
| Elastic molded product | Hardness (Shore A) | | | 53 | 53 | 53 | 53 | 53 | 53 | 53 |
| | Tensile strength at break (MPa) | | | 6.4 | 6.3 | 6.8 | 6.7 | 6.6 | 7.2 | 6.3 |
| | Tensile elongation at break (%) | | | 170 | 120 | 150 | 140 | 140 | 180 | 140 |
| | Compression set (%) | | | 2.3 | 2.9 | 2.8 | 2.9 | 2.9 | 2.6 | 2.9 |
| | Cyclic fatigue (crack growth (times/min)) | | | 11,000 | 8,000 | 8,000 | 9,000 | 8,000 | 11,000 | 8,000 |
| | Production time | | | very good | very good | very good | very good | very good | very good | very good |

TABLE 3-continued

|  |  |  |  | Examples | | Comparative Examples | | | | | |
|---|---|---|---|---|---|---|---|---|---|---|---|
|  |  |  |  | 23 | 24 | 1 | 2 | 3 | 4 | 5 | 6 |
| Polymer composition for stereolithography | Liquid polymer | Methacryloyl group-containing liquid polymer | UC102M (isoprene skeleton) | 50 | 5 | 80 | — | — | — | — | — |
|  |  | Liquid polymer | UC203M (isoprene skeleton) | — | — | — | 100 | 100 | 100 | 100 | 100 |
|  | Monomer | Monofunctional acrylate | ethoxylated nonylphenol acrylate | 50 | 95 | 20 | — | — | — | — | — |
|  |  |  | methyl 2-allyloxymethyl acrylate | — | — | — | — | — | — | — | — |
|  |  |  | isostearyl acrylate | — | — | — | — | — | — | — | — |
|  |  |  | m-phenoxybenzyl acrylate | — | — | — | — | — | — | — | — |
|  |  |  | dicyclopentanyl acrylate | — | — | — | — | — | — | — | — |
|  |  |  | isobornyl acrylate | — | — | — | — | — | — | — | 5.0 |
|  |  | Bifunctional acrylate | polyethylene glycol diacrylate | — | — | — | — | — | — | — | — |
|  |  |  | dipropylene glycol diacrylate | — | — | — | — | — | — | — | — |
|  |  |  | propoxylated neopentyl glycol diacrylate | — | — | — | — | — | — | — | — |
|  |  | Trifunctional acrylate | propoxylated glyceryl triacrylate | — | — | — | — | — | — | — | — |
|  | Oligomer | Urethane acrylate | aromatic urethane acrylate oligomer | — | — | — | — | — | — | — | — |
|  |  |  | aliphatic urethane acrylate oligomer | — | — | — | — | — | — | — | — |
|  |  |  | polyurethane acrylate/acrylic monomer | — | — | — | — | 10 | — | — | — |
|  | Diluent polymer | Liquid BR | butadiene polymer compound | — | — | — | — | — | — | — | — |
|  | Photopolymerization initiator | Alkylphenone | 2-hydroxy-2-methyl-propiophenone | 1.5 | 1.5 | 1.5 | 3.3 | 3.0 | 3.0 | 3.0 | 3.0 |
|  |  | Acylphosphine oxide | Bis(2,4,6-trimethylbenzoyl)phenylphosphine oxide | 2 | 0.0 | 0.0 | 0.0 | 0.0 | 0.0 | 0.0 | 0.0 |
|  |  | Monoacylphosphine oxide | 2,4,6-trimethylbenzoyl-diphenyl phosphine oxide | — | — | — | — | — | — | — | — |
|  | Photosensitizer | Thioxanthone | 2-isopropylthioxanthone | — | — | — | — | — | — | — | — |
|  |  | Benzophenone | 4,4'-bis(diethylamino)benzophenone | — | — | — | — | — | — | — | — |
|  |  | Acridine | 9-phenylacridine | — | — | — | — | — | — | — | — |
|  |  | Anthracene | 9,10-bis(octanoyloxy)anthracene | — | — | — | — | — | — | — | — |

TABLE 3-continued

|  |  |  |  |  |  |  |  |  |  |  |
|---|---|---|---|---|---|---|---|---|---|---|
|  | UV blocker | 2,2'-(2,5-thiophene-diyl)bis(5-tert-butyl-benzoxazole) | — | — | — | — | — | — | — | — |
|  | Vulcanized rubber | Pulverized vulcanized rubber (particle size: 85 μm) | SBR compound | — | — | — | 50 | — | — | — | — |
|  | Filler | Silica | — | — | — | — | — | 10 | — | — |
|  | Coupling agent | Silane coupling agent | — | — | — | — | — | 0.2 | — | — |
|  | Viscosity at 23° C. | mPa · s | 1,850 | 50 | 5,500 | 990,000 | 300,000 | 220,000 | 450,000 | 80,000 |
| Elastic molded product | Hardness (Shore A) |  | 54 | 64 | 43 | 28 | 32 | 35 | 26 | 36 |
|  | Tensile strength at break (MPa) |  | 7.9 | 8.3 | 1.5 | 1.0 | 1.3 | 1.2 | 0.8 | 0.8 |
|  | Tensile elongation at break (%) |  | 120 | 30 | 180 | 170 | 130 | 100 | 130 | 80,000 |
|  | Compression set (%) |  | 2.4 | 3.8 | 3.7 | 1.4 | 3.7 | 0.3 | 1.4 | 1.2 |
|  | Cyclic fatigue (crack growth (times/min)) |  | 13,000 | 100 | 400 | 100 | 400 | 400 | 300 | 100 |
|  | Production time |  | very good | very good | poor | poor | poor | poor | poor | poor |

TABLE 4

|  |  |  |  | Examples |  |  |  |  |  |  |
|---|---|---|---|---|---|---|---|---|---|---|
|  |  |  |  | 25 | 26 | 27 | 28 | 29 | 30 | 31 |
| Polymer composition for stereolithography | Liquid polymer | Methacryloyl group-containing liquid polymer | UC102M (isoprene skeleton) | 50 | 50 | 20 | — | — | — | 25 |
|  |  |  | UC400V (isoprene skeleton) | — | — | — | 50 | 50 | 50 | 25 |
|  | Monomer | Monofunctional acrylate | ethoxylated nonylphenol acrylate | — | — | — | — | — | — | — |
|  |  |  | methyl 2-allyloxymethyl acrylate | — | — | — | — | — | — | — |
|  |  |  | isostearyl acrylate | — | — | — | — | — | — | — |
|  |  |  | m-phenoxybenzyl acrylate | — | — | — | — | — | — | — |
|  |  |  | dicyclopentanyl acrylate | — | — | — | — | — | — | — |
|  |  |  | isobornyl acrylate | 50 | 30 | 30 | 50 | 30 | 30 | 30 |
|  |  | Bifunctional acrylate | polyethylene glycol diacrylate | — | — | — | — | — | — | — |
|  |  |  | dipropylene glycol diacrylate | — | — | — | — | — | — | — |
|  |  |  | propoxylated neopentyl glycol diacrylate | — | — | — | — | — | — | — |
|  |  | Trifunctional acrylate | propoxylated glyceryl triacrylate | — | — | — | — | — | — | — |
|  | Oligomer | Urethane acrylate | aromatic urethane acrylate oligomer | — | — | — | — | — | — | — |
|  |  |  | aliphatic urethane acrylate oligomer | — | — | — | — | — | — | — |
|  |  |  | polyurethane acrylate/acrylic monomer | — | — | — | — | — | — | — |
|  |  |  | aliphatic urethane acrylate oligomer | — | 20 | 50 | — | 20 | 50 | 20 |
|  | Diluent polymer | Liquid BR | butadiene polymer compound | — | — | — | — | — | — | — |
|  | Photopolymerization initiator | Alkylphenone | 2-hydroxy-2-methyl-propiophenone | 1.5 | 1.5 | 1.5 | 1.5 | 1.5 | 1.5 | 1.5 |
|  |  | Acylphosphine oxide | Bis(2,4,6-trimethylbenzoyl)phenylphosphine oxide | 0.7 | 0.7 | 0.7 | 0.7 | 0.7 | 0.7 | 0.7 |
|  |  | Monoacylphosphine oxide | 2,4,6-trimethylbenzoyl-diphenyl phosphine oxide | — | — | — | — | — | — | — |

TABLE 4-continued

|  |  |  |  | Examples | | | | | | |
|---|---|---|---|---|---|---|---|---|---|---|
|  |  |  |  | 25 | 26 | 27 | 28 | 29 | 30 | 31 |
|  | Photo-sensitizer | Thio-xanthone | 2-isopropylthioxanthone | — | — | — | — | — | — | — |
|  |  | Benzo-phenone | 4,4'-bis(diethyl-amino)benzo-phenone | — | — | — | — | — | — | — |
|  |  | Acridine | 9-phenyl-acridine | — | — | — | — | — | — | — |
|  |  | Anthra-cene | 9,10-bis(octa-noyloxy)anthra-cene | — | — | — | — | — | — | — |
|  | UV blocker |  | 2,2'-(2,5-thiophene-diyl)bis(5-tert-butyl-benzoxazole) | — | — | — | — | — | — | — |
|  | Vulcanized rubber | Pulverized vulcanized rubber (particle size: 85 μm) | SBR compound | — | — | — | — | — | — | — |
|  | Filler | Silica |  | — | — | — | — | — | — | — |
|  | Coupling agent | Silane coupling agent |  | — | — | — | — | — | — | — |
|  | Viscosity at 23° C. | mPa·s |  | 1,300 | 1,500 | 2,100 | 2,100 | 2,300 | 2,900 | 2,100 |
| Elastic molded product | Hardness (Shore A) |  |  | 63 | 83 | 79 | 88 | 90 | 85 | 80 |
|  | Tensile strength at break (MPa) |  |  | 10.5 | 11.0 | 14.0 | 13.5 | 15.0 | 18.0 | 16.0 |
|  | Tensile elongation at break (%) |  |  | 130 | 180 | 250 | 280 | 330 | 370 | 350 |
|  | Compression set (%) |  |  | 3.2 | 3.8 | 4.5 | 8.5 | 7.2 | 5.5 | 5.2 |
|  | Cyclic fatigue (crack growth (times/min)) |  |  | 6,000 | 6,000 | 4,000 | 4,000 | 4,000 | 6,000 | 6,000 |
|  | Production time |  |  | very good | very good | very good | very good | very good | very good | very good |

As shown in Tables 2 to 4, the polymer compositions for stereolithography of Examples 1 to 31 contain a liquid polymer and a monomer, and have a viscosity at a temperature of 25° C. of 3,000 mPa·s or less. The polymer compositions for stereolithography of Examples 1 to 31 have a low viscosity at room temperature, and can be suitably used in stereolithography techniques such as the SLA, the DLP, and the LCD to produce a desired elastic molded product. In addition, the obtained elastic molded products are satisfactory in various physical properties such as the hardness, tensile strength at break, tensile elongation at break, compression set, and cyclic fatigue.

The invention claimed is:

1. A polymer composition for stereolithography comprising:
 a liquid polymer;
 a monomer; and
 at least two photopolymerization initiators different in absorption band;
 wherein the polymer composition for stereolithography has a viscosity of 3,000 mPa·s or less, the viscosity being measured in an environment of a temperature of 25° C. and a relative humidity of 50% using an E-type viscometer under conditions of a cone plate diameter φ of 25 mm and a shear rate of 100 sec$^{-1}$, and
 wherein the liquid polymer includes at least one of a liquid isoprene having a (meth)acryloyl group and a liquid isobutylene having a (meth)acryloyl group.

2. The polymer composition for stereolithography according to claim 1, wherein the liquid polymer includes the liquid isoprene having the (meth)acryloyl group.

3. The polymer composition for stereolithography according to claim 1, wherein the liquid polymer has a number average molecular weight of 5,000 or more and 500,000 or less, wherein the number average molecular weight of the liquid polymer is a value in terms of standard polystyrene, and is measured using a gel permeation chromatograph.

4. The polymer composition for stereolithography according to claim 1, wherein the liquid polymer has a viscosity of 100 mPa·s or more and 1,000,000 mPa·s or less, the viscosity being measured in an environment of a temperature of 25° C. and a relative humidity of 50% using an E-type viscometer under conditions of a cone plate diameter φ of 25 mm and a shear rate of 100 sec$^{-1}$.

5. The polymer composition for stereolithography according to claim 1, having a content rate of the liquid polymer of 15 mass % or more and 70 mass % or less.

6. The polymer composition for stereolithography according to claim 1, having a percentage of the monomer of 30 mass % or more and 85 mass % or less based on 100 mass % in total of the liquid polymer and the monomer.

7. The polymer composition for stereolithography according to claim 1, further comprising an oligomer, and having a percentage of the monomer of 30 mass % or more and 90 mass % or less based on 100 mass % in total of the liquid polymer, the monomer, and the oligomer.

8. The polymer composition for stereolithography according to claim 1, further comprising an oligomer, and having a total percentage of the monomer and the oligomer of 30 mass % or more and 90 mass % or less based on 100 mass % in total of the liquid polymer, the monomer, and the oligomer.

9. The polymer composition for stereolithography according to claim 8, wherein the oligomer is at least one of urethane (meth)acrylate and epoxy (meth)acrylate.

10. The polymer composition for stereolithography according to claim 7, wherein the oligomer includes a (meth)acrylate.

11. The polymer composition for stereolithography according to claim 1, wherein the monomer is at least one of monofunctional to tetrafunctional monomers.

12. The polymer composition for stereolithography according to claim 1, wherein the monomer includes a (meth)acrylate.

13. An elastic molded product, which is a cured product of the polymer composition for stereolithography according to claim 1.

14. A method for producing an elastic molded product, the method comprising:
- supplying the polymer composition for stereolithography according to claim 1 onto a molding table, and curing the polymer composition for stereolithography by light irradiation to form a first layer of a cured product;
- supplying, onto the first layer of the cured product, the polymer composition for stereolithography for forming a second layer of a cured product, and curing the polymer composition for stereolithography by light irradiation to form the second layer of the cured product; and
- repeating the step of forming the second layer of the cured product until an N-th layer is formed to produce an elastic molded product having a three-dimensional shape.

\* \* \* \* \*